US012191580B2

(12) United States Patent
Sundararajan et al.

(10) Patent No.: US 12,191,580 B2
(45) Date of Patent: Jan. 7, 2025

(54) LOWBAND DIPOLE WITH IMPROVED GAIN AND ISOLATION

(71) Applicant: John Mezzalingua Associates, LLC, Liverpool, NY (US)

(72) Inventors: Niranjan Sundararajan, Clay, NY (US); Wengang Chen, Jamesville, NY (US); Jiaqiang Zhu, Baldwinsville, NY (US)

(73) Assignee: John Mezzalingua Associates, LLC, Liverpool, NY (US)

( * ) Notice: Subject to any disclaimer, the term of this patent is extended or adjusted under 35 U.S.C. 154(b) by 143 days.

(21) Appl. No.: 18/101,332

(22) Filed: Jan. 25, 2023

(65) Prior Publication Data

US 2023/0299485 A1 Sep. 21, 2023

Related U.S. Application Data

(60) Provisional application No. 63/303,085, filed on Jan. 26, 2022.

(51) Int. Cl.

| | |
|---|---|
| ***H01Q 5/42*** | (2015.01) |
| ***H01Q 1/24*** | (2006.01) |
| ***H01Q 1/52*** | (2006.01) |
| ***H01Q 21/26*** | (2006.01) |

(52) U.S. Cl.

CPC ............... *H01Q 5/42* (2015.01); *H01Q 1/246* (2013.01); *H01Q 1/521* (2013.01); *H01Q 21/26* (2013.01)

(58) Field of Classification Search

CPC .......... H01Q 1/246; H01Q 1/52; H01Q 1/521; H01Q 1/523; H01Q 1/525; H01Q 5/42; H01Q 5/48; H01Q 21/26

See application file for complete search history.

(56) References Cited

U.S. PATENT DOCUMENTS

| | | | |
|---|---|---|---|
| 2020/0328533 | A1 | 10/2020 | Sundararajan et al. |
| 2020/0373668 | A1 | 11/2020 | Wu et al. |
| 2021/0050675 | A1 | 2/2021 | Jang et al. |
| 2021/0280985 | A1 | 9/2021 | Waldauer et al. |
| 2021/0359414 | A1 | 11/2021 | Sundararajan et al. |
| 2024/0113418 | A1 * | 4/2024 | Enkhbayar ............. H01Q 21/24 |

OTHER PUBLICATIONS

International Search report and Written Opinion issued for Application No. PCT/US2023/061280, dated May 23, 2023. 9 pages.

* cited by examiner

*Primary Examiner* — Robert Karacsony

(74) *Attorney, Agent, or Firm* — Meunier Carlin & Curfman LLC

(57) ABSTRACT

A lowband radiator has four dipole arms and a central region that is centered at the intersection of the dipole arms. Each of the dipole arms has a sequence of capacitive and inductive structures and a pair of high gain wings that are disposed in the dipole central region. In one embodiment of the lowband radiator, each dipole arm has a gap within the central region that is colinear with the dipole arm. The dipoles provide for improved isolation from nearby midband radiators while providing high gain.

12 Claims, 8 Drawing Sheets

LOWBAND DIPOLE WITH IMPROVED GAIN AND ISOLATION

This application is a non-provisional of and claims priority to Provisional Patent Application Ser. No. 63/303,085, filed Jan. 26, 2022, which application is hereby incorporated by this reference in its entirety as if fully set forth herein.

BACKGROUND OF THE INVENTION

Field of the Invention

The present invention relates to wireless communications, and more particularly, to multiband cellular antennas.

Related Art

Modern cellular communication is seeing the incorporation of new frequency bands to enable increased data rates and new services to customers. Examples include the incorporation of C-Band (3.4-4.2 GHZ) and CBRS (Citizen Broadband Radio Service, 3.7-4.2 GHz), which are being added to legacy bands lowband (617-8904 MHZ) and midband (1695-2690 MHz).

The incorporation of new frequency bands presents a challenge to antenna designers in that there is significant resistance to increasing the size of cellular antennas to accommodate radiators designed to operate in the new frequency bands. For example, increasing the size of a cellular antenna worsens its wind loading, which may lead to significant problems for antennas that are mounted on top of cell towers. Accordingly, mobile network operators are reluctant to increase the size of their antennas. This puts considerable pressure on antenna designers to design antenna radiators and radiator configurations for lowband, midband, and C-Band, or CBRS that can be packed into existing antenna form factors while not suffering from interference between frequency bands. This interference can degrade the performance of the antenna radiators by, for example, corrupting the antenna gain pattern.

Lowband radiators are particularly problematic in that they are the largest structures within a multiband antenna and are thus the most susceptible to causing interference with the other bands. Conventional solutions, such as antenna cloaking, may be employed in the design of lowband dipoles to mitigate interference from the midband (for example), but these conventional solutions typically decrease the gain of the lowband dipoles themselves.

Accordingly, what is needed is a lowband dipole design that provides for effective cloaking without sacrificing gain.

SUMMARY OF THE DISCLOSURE

An aspect of the present disclosure involves a dipole for a multiband antenna. The dipole comprises four dipole arms arranged in a cross pattern, wherein the four dipole arms has a first pair of dipole arms that are colinear and configured to radiate a first RF (Radio Frequency) signal at a first polarization angle and a second pair of dipole arms that are colinear and configured to radiate a second RF signal at a second polarization angle, wherein the first polarization angle is perpendicular to the second polarization angle; and a central region, wherein the central region is centered at an intersection of the first pair of dipole arms and the second pair of dipole arms, wherein each of the dipole arms comprises a sequence of capacitive structures and inductive structures and a pair of high gain wings, wherein the pair of high gain wings are disposed in the central region.

Another aspect of the present disclosure involves a multiband antenna. The multiband antenna comprises a plurality of midband dipoles arranged in a plurality of unit cells, wherein the plurality of unit cells are arranged in columns; and a plurality of lowband dipoles, wherein each of the plurality of lowband dipoles is disposed within a corresponding unit cell, wherein each of the lowband dipoles has four dipole arms arranged in a cross pattern, wherein the four dipole arms are arranged in a first pair of dipole arms and a second pair of dipole arms, the first pair of dipole arms are colinear and configured to radiate a first RF (Radio Frequency) signal at a first polarization angle and the second pair of dipole arms are colinear and configured to radiate a second RF signal at a second polarization angle, wherein the first polarization angle is perpendicular to the second polarization angle, wherein each of the lowband radiators has a central region, wherein the central region is centered at an intersection of the first pair of dipole arms and the second pair of dipole arms, wherein each of the dipole arms comprises a sequence of capacitive structures and inductive structures and a pair of high gain wings, wherein the pair of high gain wings are disposed in the central region, wherein each of the dipole arms has an outer arm that overlaps a corresponding midband dipole.

DESCRIPTION OF EXEMPLARY EMBODIMENTS

Figure 1A:
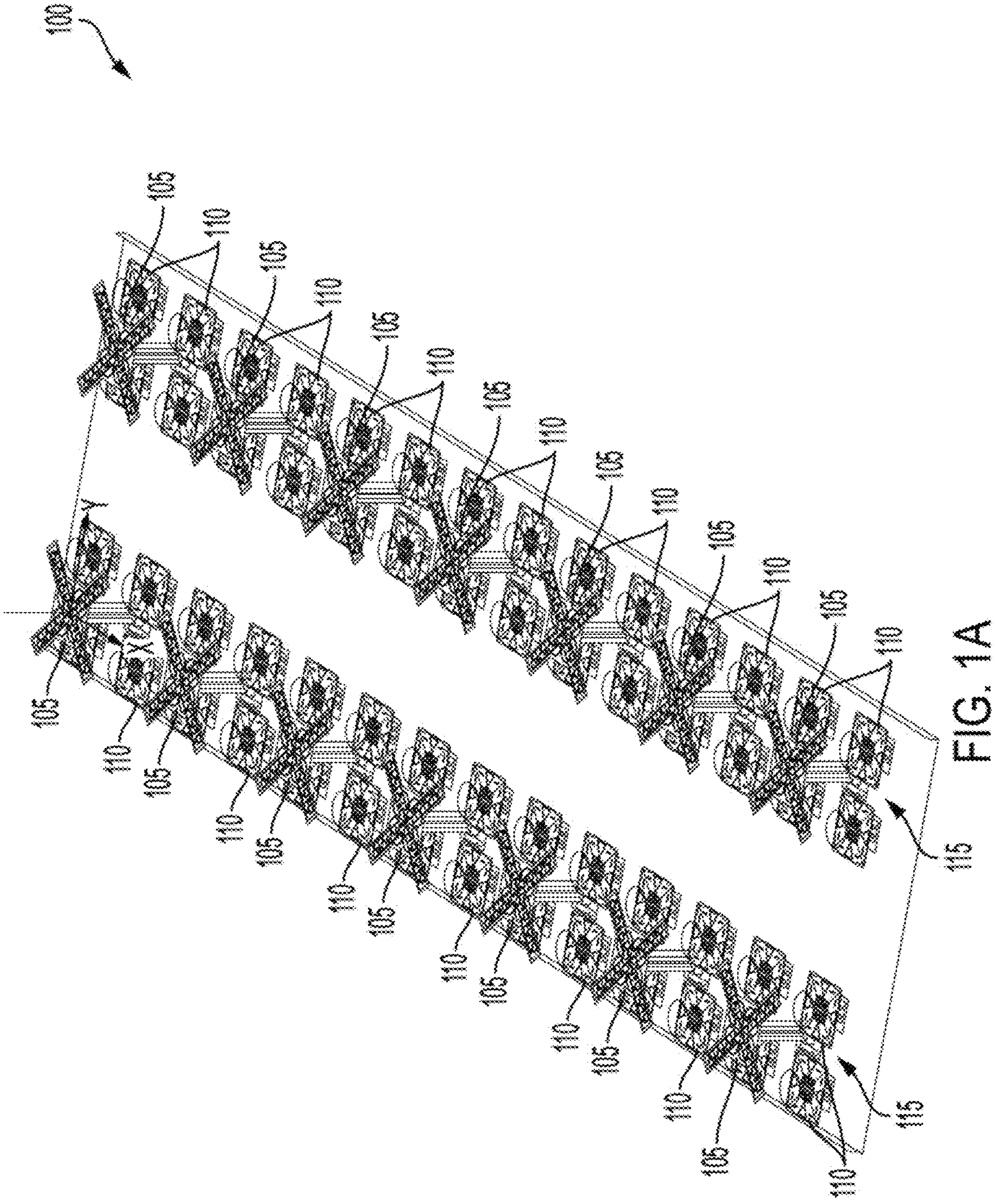
FIG. 1A illustrates an exemplary multiband antenna array face incorporating a lowband dipole of a first embodiment according to the disclosure.

FIG. 1A illustrates an exemplary multiband array face 100 according to the disclosure. Array face 100 includes a plurality of lowband dipoles 105 and a plurality of midband dipoles 110. For the convenience of illustration, any additional frequency band radiators, such as C-Band or CBRS, are left out of the drawing. As illustrated, lowband radiators 105 are arranged in two columns 115 of unit cells having four midband dipoles 110 and a single lowband dipole 105. Exemplary multiband array face 100 may be used in an antenna designed to have a 65 degree azimuth beamwidth.

Figure 1B:
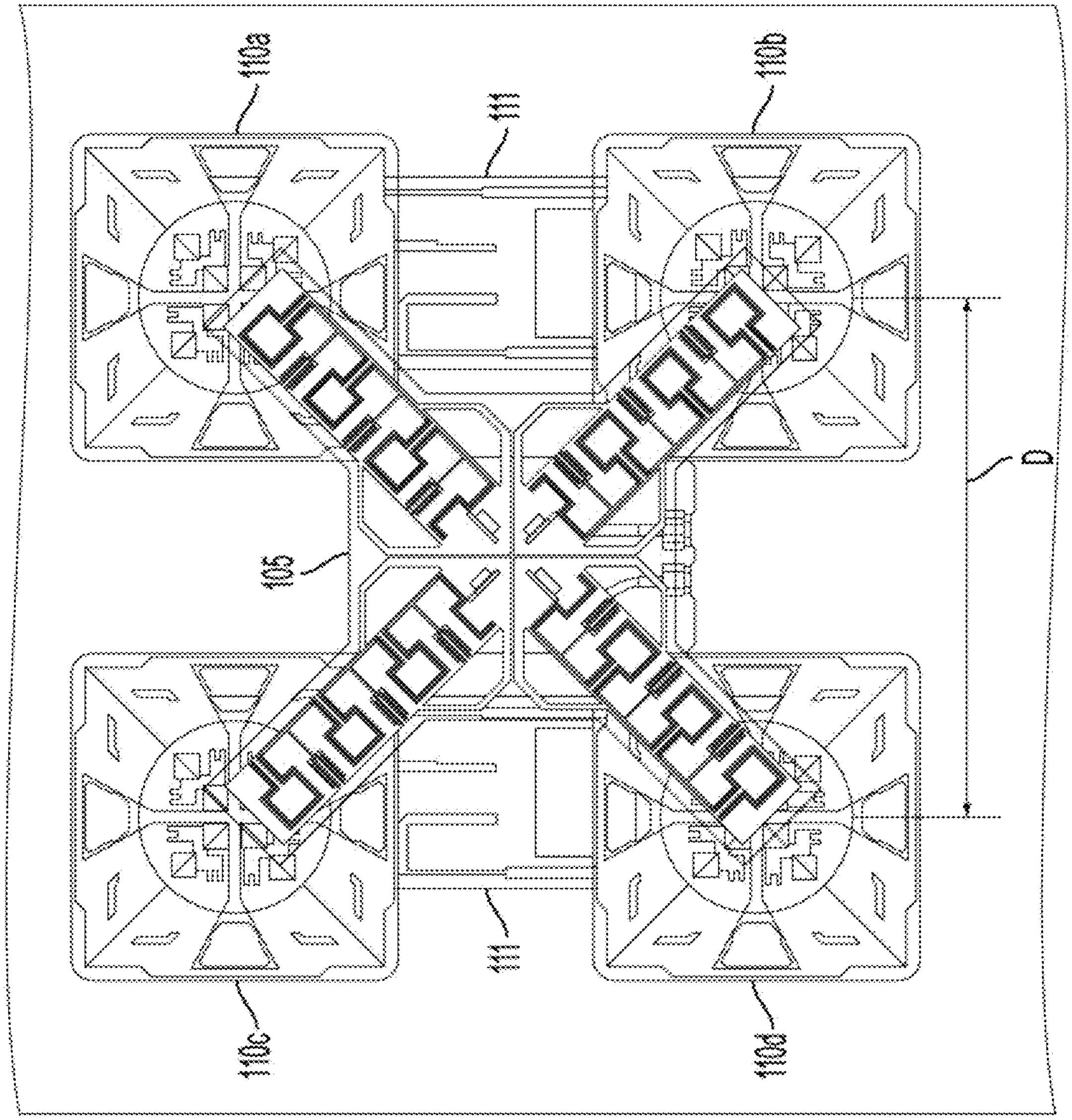
FIG. 1B illustrates a single unit cell within the antenna of FIG. 1A.

FIG. 1B illustrates an exemplary unit cell of the antenna of FIG. 1. The unit cell has a single lowband dipole 105 that is placed among an array of four midband dipoles 110*a-d*. Midband dipoles 110*a-d* may have two independent and orthogonal radiators, each of which may be fed an independent signal so that two signals may operate at orthogonal (e.g., +/−45 deg) polarizations. Midband dipoles 110*a* and 110*b* may be fed two signals such that the +45 degree radiator of midband dipoles 110*a* and 110*b* may be fed a single signal that may have imparted on it a phase difference to enable beam pointing in the vertical plane. Similarly, midband dipoles 110*a* and 110*b* may be fed two signals such that the −45 degree radiator of midband dipoles 110*a* and 110*b* may be fed a single signal that may have imparted on it a phase difference to enable beam pointing in the vertical plane. The same applies to midband dipoles 110*c* and 110*d*.

There are two possible modes of feeding signals to midband dipoles 110*a-d*. In a first mode, midband dipoles 110*a-d* may all be provided the same signals (for both +/−45 deg polarization). Midband dipoles 110*a/c* may be provided these signals at a first phase offset and midband dipoles 110*b/d* may be provided the same signals but at a second phase offset. The differential phasing between midband dipoles 110*a/c* and 110*b/d* may be used to provide beam steering (tilt) in the vertical plane. This mode—with all the midband dipoles receiving the same signals) provides for an array effect such that the azimuth beam width may be controlled, based on lateral spacing D. In the example discussed here, the azimuth beamwidth may be 65 degrees.

In a second mode, midband dipoles 110*a/b* may be provided a first set of signals (one per +/−45 deg polarization) and midband dipoles may be provided a second set of signals (one per +/−45 deg polarization). This mode has a disadvantage of not having an array effect of the first mode, and as such the azimuth beamwidth in this mode will be broader. However, this mode offers an advantage of being able to handle twice as many signals in the midband. It will be understood that such variations are possible and within the scope of the disclosure.

The illustrated example in FIG. 1B shows two midband feedboards 111, which would be used in the second mode, in which a first set of signals (one per +/−45 degree polarization) is provided to midband dipoles 110*a/b* and a second set of signals (one per +/−45 degree polarization) is provided to midband dipoles 110*c/d*. It will be understood that a variation to the unit cell of FIG. 1B may have a single midband feedboard (not shown) in the case of a 65 degree azimuth beamwidth antenna.

In the case in which antenna 100 is designed to have a 65 degree azimuth beamwidth, lateral midband dipole spacing D may be approximately 114 mm.

Referring to FIG. 1B, lowband dipole 105 is placed within the cluster of four midband dipoles 110*a-d*. Lowband dipole 105 may be placed in the center of the cluster (as illustrated) or may be located at an offset in the horizontal and/or vertical directions. As can be observed in FIG. 1B, there is considerable shadowing of the midband dipoles 110*a-d* by the arms of lowband dipole 105, which may exacerbate interference between the lowband dipole 105 and the midband dipoles 110*a-d*. Narrowing the arms of lowband dipole 105 may reduce this interference, but this would also reduce the gain of lowband dipole 105. The structure of exemplary 105 dipole may be designed to strike a proper balance between high low band gain and mitigating interference, as described below.

Figure 1C:
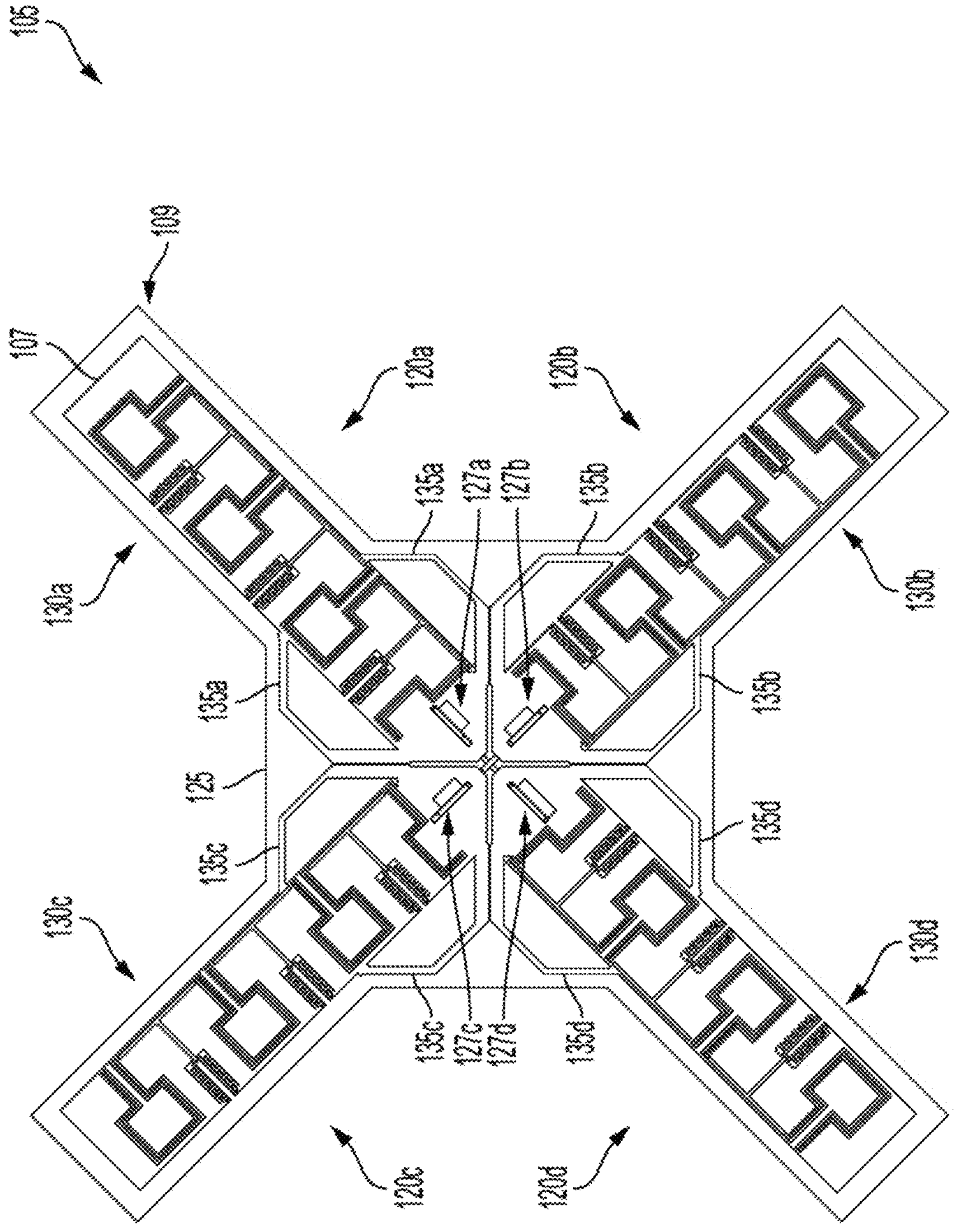
FIG. 1C illustrates an exemplary lowband dipole according to a first embodiment of the disclosure.

FIG. 1C illustrates an exemplary lowband dipole 105 according to a first embodiment according to the disclosure. Lowband dipole 105 may be formed of a patterned conductive layer 107 that is disposed on a PCB (Printed Circuit Board) substrate 109. Lowband dipole 105 has four dipole arms 120*a-d*, whereby dipole arms 120*a* and 120*d* are colinear and are fed a first signal through a first balun circuit (not shown) via balun coupling points 127*a* and 127*d* that causes dipole arms 120*a* and 120*d* to radiate the first signal at a first (e.g., +45 deg) polarization orientation; and whereby dipole arms 120*b* and 120*c* are colinear and fed a second signal through a second balun circuit (not shown) via balun coupling points 127*b* and 127*c* that causes dipole arms 120*b* and 120*c* to radiate the second signal at a second (e.g., −45 deg) polarization orientation.

Lowband dipole 105 has a layout that includes four outer arms 130*a-d*, which are the outer portions of dipole arms 120*a-d* and jut out diagonally from a central region 125. In the case of dipole arm 120*a*, dipole arm 120*a* as an outer arm region 130*a*, whereby the conductive portion of dipole arm 120*a* extends from balun coupling point 127*a* within central region 125 out through outer arm region 130*a*. Dipole arm 120*a* also includes a set of high gain wings 135*a*, which may comprise conductive traces on either side of the arm structure within central region 125. Similarly, dipole arm 120*b* as an outer arm region 130*b*, whereby the conductive portion of dipole arm 120*b* extends from balun coupling point 127*b* within central region 125 out through outer arm region 130*b*. Dipole arm 120*b* also includes a set of high gain wings 135*b*, which may comprise conductive traces on either side of the arm structure within central region 125. The same applies to dipole arms 120*c* and 120*d* and their respective components.

The high gain wings 135*a-d* located in central region 125 improves gain by increasing the volume of lowband dipole 105 such that a larger portion of that volume is not overlapping the midband dipoles 110.

Each of dipole arms 120*a-d* has a conductive pattern that includes a series of capacitive and inductive structures, which are described below in reference to FIG. 1D.

The incorporation of high gain wings 135*a-d* provides additional gain to corresponding dipole arms 120*a-d*. The function of the high gain wings 135*a-d* may be as follows. As illustrated in FIG. 1B, lowband dipole 105 is in close proximity with four midband dipoles 110 such that the outer arm regions 130*a-d* substantially overlap with the midband dipoles 110. As mentioned above, it is possible to reduce interference by narrowing dipole arms 120*a-d*. However, as mentioned above, this reduces the lowband gain. Incorporating high gain wings 135*a-d* enables the outer arm regions 130*a-d* such that interference may be reduced, with the high gain wings 135*a-d* boosting the lowband gain of each lowband dipole 120*a-d*, thereby striking an appropriate balance between minimal interference and maximum gain. Further, given that the high gain wings 135*a-d* are disposed on central region of lowband dipole 105, the high gain wings 135*a-d* do not overlap the midband dipoles 110.

Figure 1D:
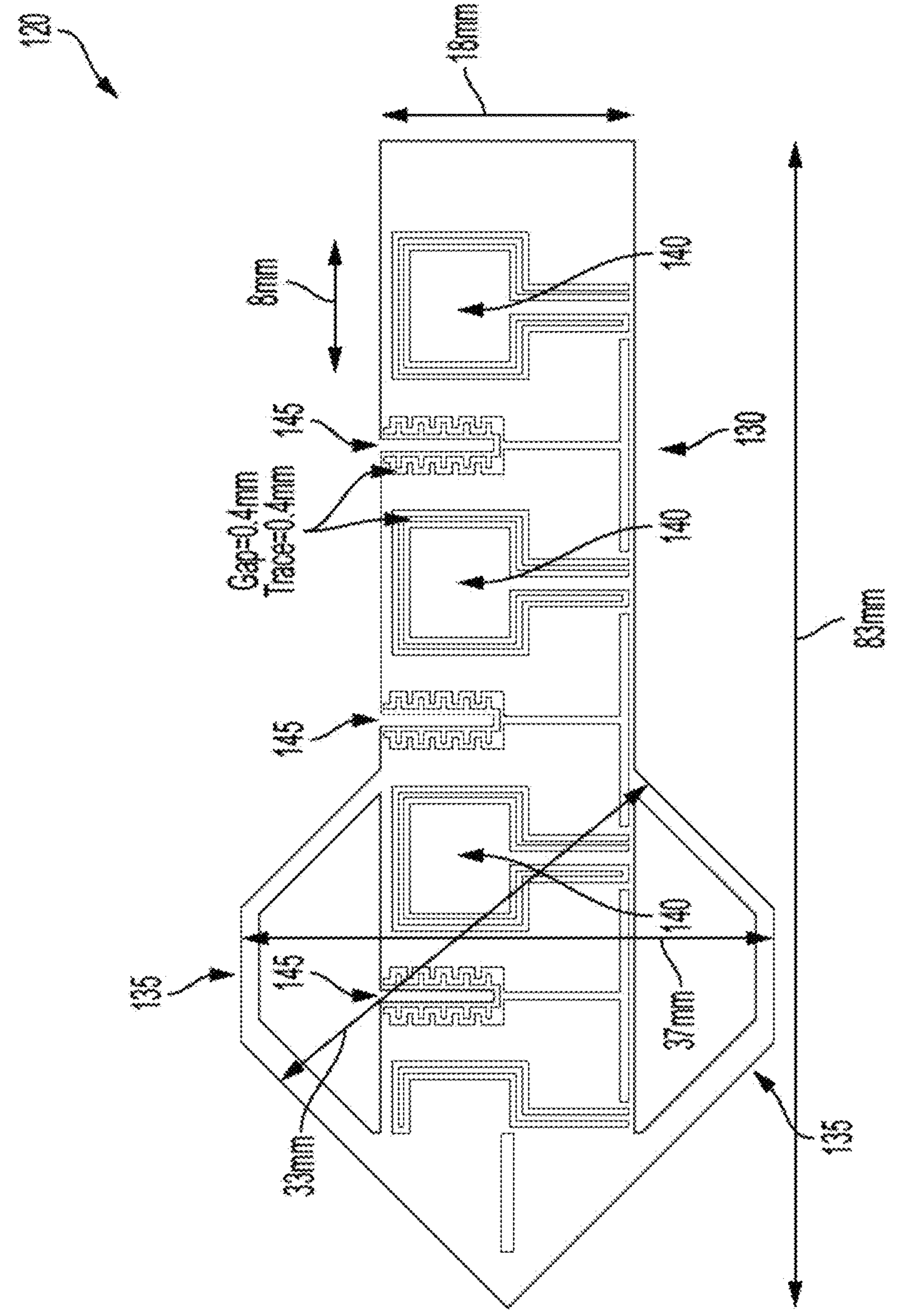
FIG. 1D is a closeup view of an exemplary radiator arm of the lowband dipole the first embodiment.

FIG. 1D illustrates an outer arm region 130 of a dipole arm 120 according to the disclosure, along with exemplary dimensions. The structure illustrated in FIG. 1D may be of any of the dipole arms 120*a-d* described above. Dipole arm 120 has an alternating plurality of capacitive structures 140 and inductive structures 145 that are formed in patterned conductive layer 107. Each inductive structure may have a high impedance line formed in the conductive layer 107. The spacing of the capacitive structure 140 and the inductive structure 145 is provided to make the dipole arm 120 transparent to any RF (Radio Frequency) emissions from the midband dipoles 110, whereas the capacitance and inductance of the respective capacitive structure 140 and inductive structure 145 allows the lowband RF energy to radiate in the dipole arm 120 unabated.

The size and spacing of capacitive structures 140 and inductive structures 145 may vary depending on the band of the dipole (e.g., midband, CBRS, etc.) that is in close proximity to the lowband dipole 105.

Figure 2A:
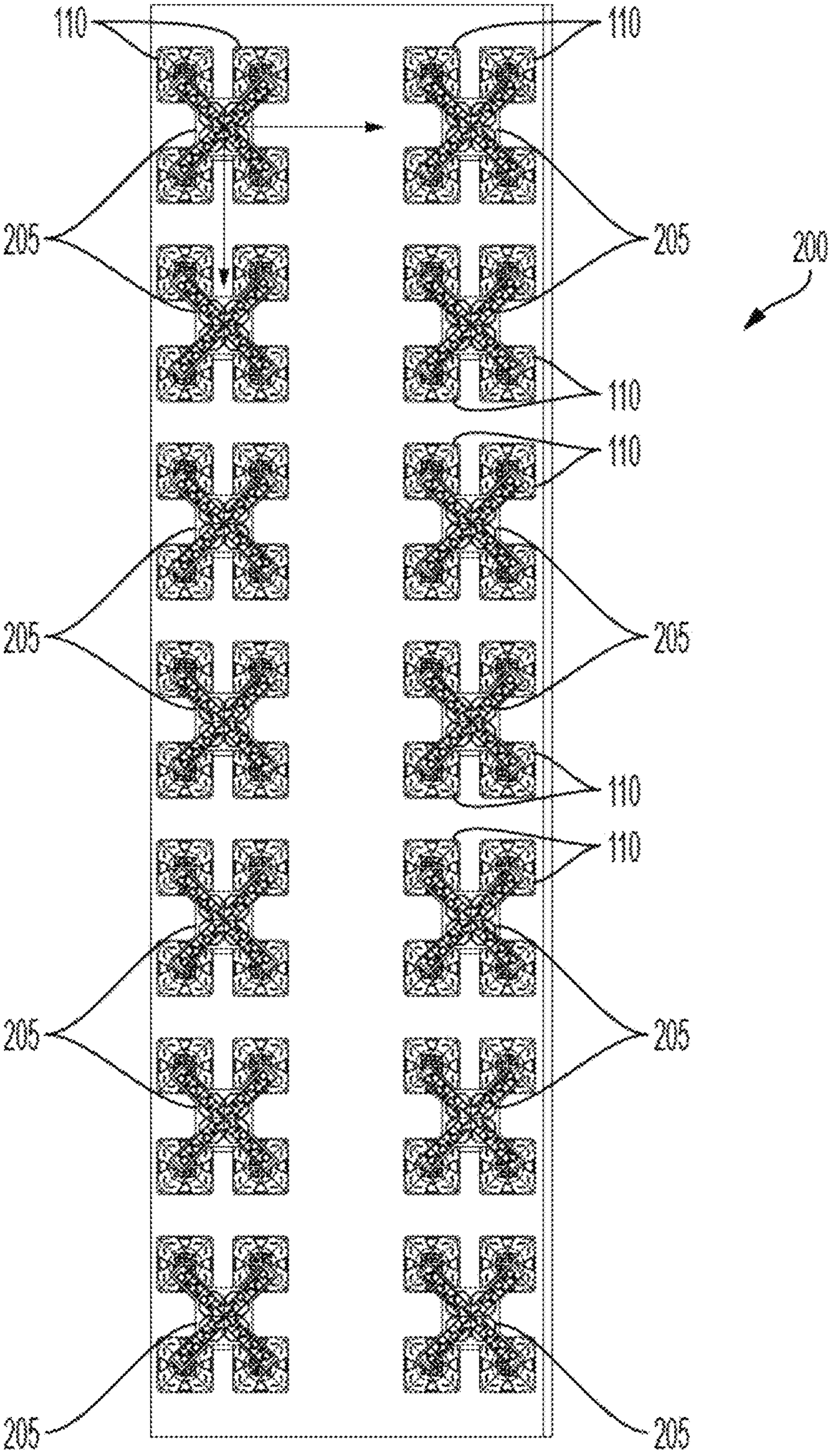
FIG. 2A illustrates an exemplary multiband array face incorporating a lowband dipole of a second embodiment according to the disclosure.

FIG. 2A illustrates an exemplary array face 200, which may be used for an antenna designed to have a 45 degree azimuth beamwidth. As with FIG. 1A, the radiators for other bands, such as C-Band or CBRS, are omitted for purposes of illustration. Array face 200 includes a plurality of lowband radiators 205 of a second embodiment of the disclosure. Each of the plurality of lowband radiators 205 are disposed within a cluster of four midband radiators 110, which may be identical to the midband radiators 110 of antenna array face 100.

Figure 2B:
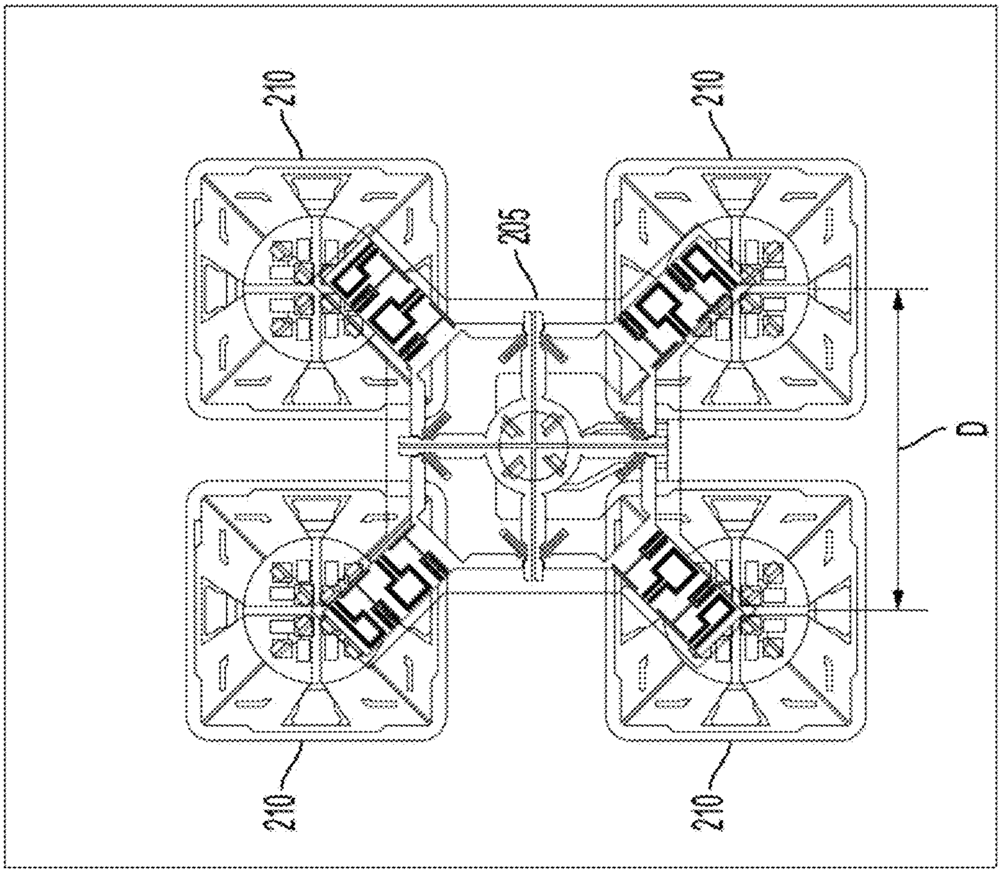
FIG. 2B illustrates a unit cell within the antenna of FIG. 2A.

FIG. 2B illustrates an exemplary unit cell for array face 200. As illustrated, a single lowband dipole 205 is disposed in the center of a cluster of four midband dipoles 110. However, in contrast to the unit cell of FIG. 1B, the midband dipoles for the 45 degree azimuth beam array face 200 are separated at a lateral spacing D of 90 mm. Having the midband dipoles 110 spaced more closely together in the proximity lowband dipole 205 exacerbates the interference problem in that if lowband dipole 105 were used in this unit cell, a greater proportion of lowband dipole 105 would overlap with the four midband dipoles 110. Accordingly, lowband dipole 205 may be used.

Figure 2C:
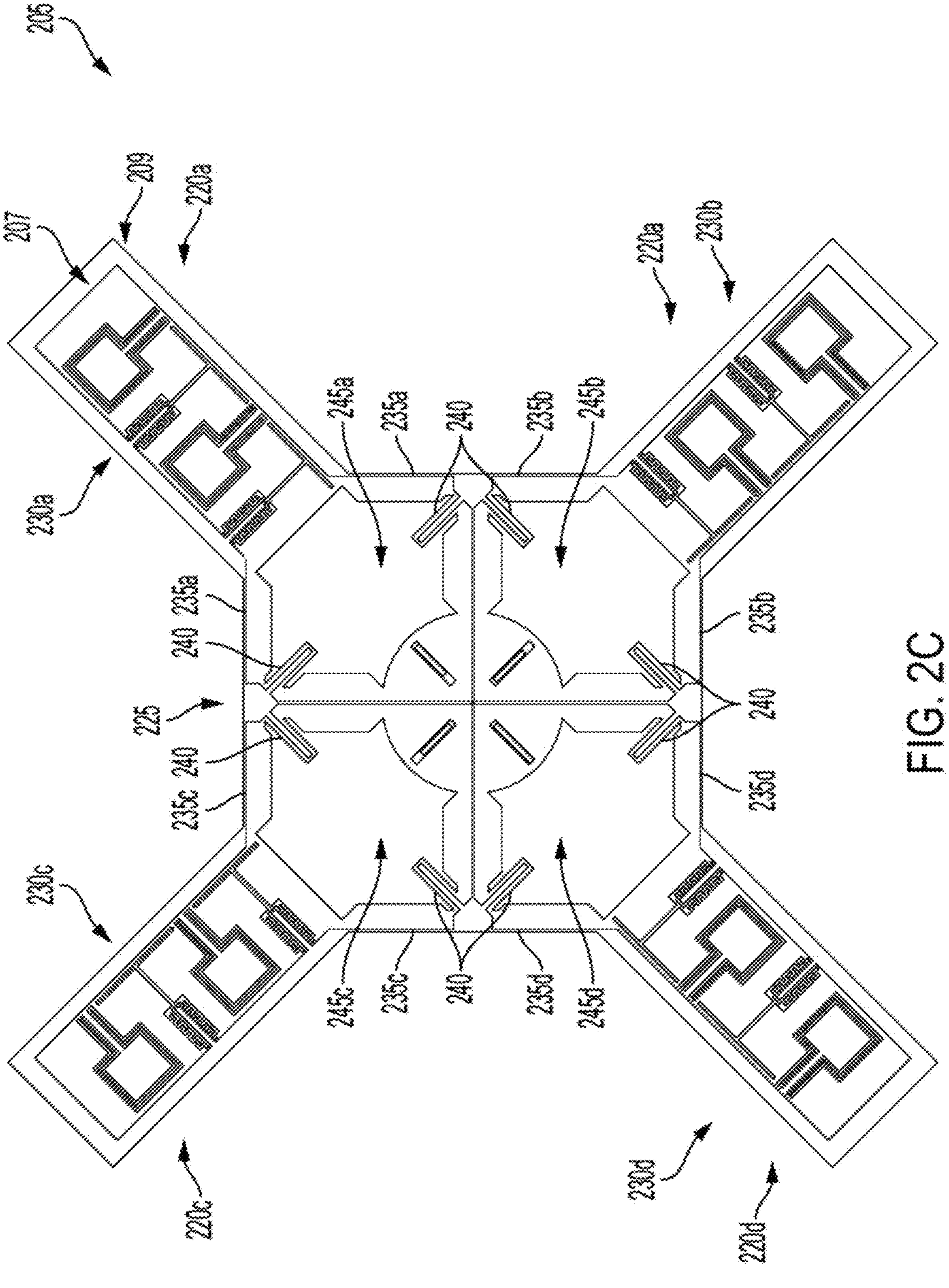
FIG. 2C illustrates an exemplary lowband dipole according to a second embodiment according to the disclosure.

FIG. 2C illustrates exemplary lowband dipole 205 according to the disclosure. Lowband dipole 205 has a patterned conductive layer 207 that is disposed on a PCB substrate 209. Lowband dipole 205 has four dipole arms 220*a-d*, whereby dipole arms 220*a* and 220*d* are colinear and configured to radiate a first RF signal, and dipole arms 220*b* and 220*c* are colinear and configured to radiate a second RF signal. Each of the four dipole arms 220*a-d* has a corresponding outer arm region 230*a-d* that juts out from a central region 225 and. Dipole arms 220*a-d* are shorter than dipole arms 120*a-d*. This is to reduce the overlap of lowband dipole 205 over midband dipoles 110. To compensate for the shorter dipole arms 220*a-d*, the corresponding high gain wings 235*a-d* are increased in area and structure, thereby increasing the volume of lowband dipole 205 to increase gain. Another feature of lowband dipole 205 is that each dipole arm 220*a-d* has a gap 245*a-d*, which provides a clear space in the conductive layer 207 that is colinear with its corresponding outer arm region 230*a-d*. This has the effect of eliminating some of the overlap of dipole arms 230*a-d* and the midband dipoles 110, and thereby reducing the interference. Each of the high gain wings 235*a-d* of dipole arms 230*a-d* has an inductive choke 240 disposed at a corner of the high gain wing 235*a-d* that provides further cloaking to prevent midband RF energy radiating from midband dipoles 110 from resonating in the high gain wings 235*a-d*, rendering the high gain wings transparent to the midband dipoles 110. Each of the dipole arms 230*a-d* has an alternating sequence of inductive structures and capacitive structures that may be similar to those illustrated in FIG. 1D.

Figure 2D:
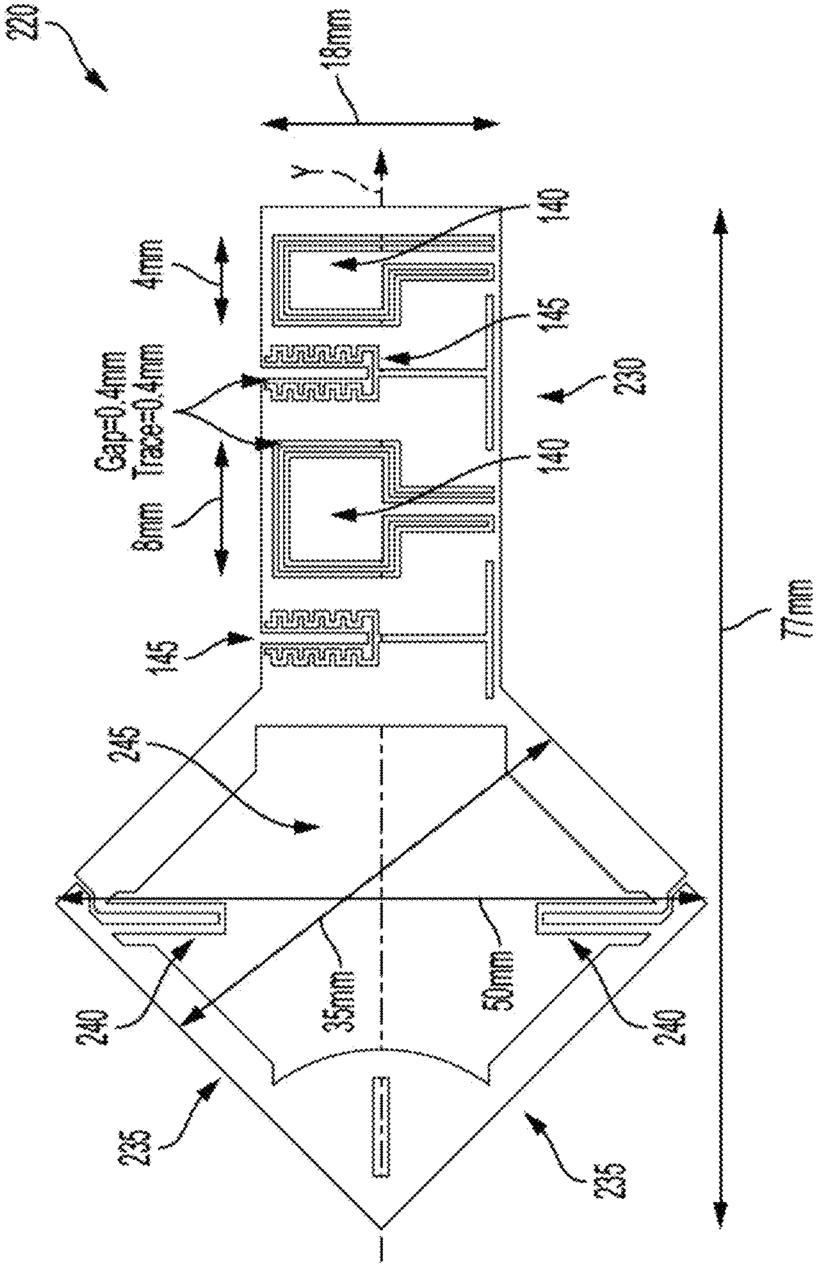
FIG. 2D is a closeup view of an exemplary radiator arm of a lowband dipole according to a second embodiment.

FIG. 2D illustrates an exemplary dipole arm 220 according to the disclosure, along with exemplary dimensions. Dipole arm 220 of FIG. 2D has variations to the dipole arms 220*a-d* illustrated in FIG. 1C. It will be understood that such variations are possible and within the scope of the disclosure. Referring to FIG. 2D, dipole arm 220 has an outer arm region 230 and two high gain wings 235, each of which having an inductive choke 240 disposed at a corner. Outer arm region 230 has a plurality of capacitive structures 140 and inductive structures 145 that are arranged in an alternating sequence. Dipole arm 220 has a gap 245 formed in the conductor, whereby gap 245 is substantially colinear with outer arm region 230.

What is claimed is:

1. A dipole for a multiband antenna, comprising:

four dipole arms arranged in a cross pattern, wherein the four dipole arms are arranged in a first pair of dipole arms and a second pair of dipole arms, the first pair of dipole arms are colinear and configured to radiate a first RF (Radio Frequency) signal at a first polarization angle and the second pair of dipole arms are colinear and configured to radiate a second RF signal at a second polarization angle, wherein the first polarization angle is perpendicular to the second polarization angle; and a central region, wherein the central region is centered at an intersection of the first pair of dipole arms and the second pair of dipole arms, wherein each of the dipole arms comprises a sequence of capacitive structures and inductive structures and a pair of high gain wings, wherein the pair of high gain wings are disposed in the central region.

2. The dipole of claim 1, wherein the dipole comprises:

a PCB (Printed Circuit Board) substrate; and a patterned conductive layer disposed on the PCB substrate, wherein each of the dipole arms are formed of the patterned conductive layer.

3. The dipole of claim 1, wherein the sequence of capacitive structures and inductive structures comprises an alternating sequence.

4. The dipole of claim 1, wherein each of the inductive structures comprises a high impedance line.

5. The dipole of claim 1, wherein each of the high gain wings is disposed proximate to a perimeter of the central region.

6. The dipole of claim 5, wherein each of the four dipole arms comprises a gap that is disposed in the central region, wherein the gap substantially occupies a region colinear with the dipole arm.

7. The dipole of claim 6, wherein each high gain wing comprises an inductive choke disposed at a high gain wing corner.

8. A multiband antenna, comprising:

a plurality of midband dipoles arranged in a plurality of unit cells, wherein the plurality of unit cells are arranged in columns; and a plurality of lowband dipoles, wherein each of the plurality of lowband dipoles is disposed within a corresponding unit cell, wherein each of the lowband dipoles has four dipole arms arranged in a cross pattern, wherein the four dipole arms are arranged in a first pair of dipole arms and a second pair of dipole arms, the first pair of dipole arms are colinear and configured to radiate a first RF (Radio Frequency) signal at a first polarization angle and the second pair of dipole arms are colinear and configured to radiate a second RF signal at a second polarization angle, wherein the first polarization angle is perpendicular to the second polarization angle, wherein each of the lowband radiators has a central region, wherein the central region is centered at an intersection of the first pair of dipole arms and the second pair of dipole arms, wherein each of the dipole arms comprises a sequence of capacitive structures and inductive structures and a pair of high gain wings, wherein the pair of high gain wings are disposed in the central region, wherein each of the dipole arms has an outer arm that overlaps a corresponding midband dipole.

9. The multiband antenna of claim 8, wherein each of the unit cells comprises a midband dipole spacing that corresponds to an azimuth beamwidth.

10. The multiband antenna of claim 9, wherein the multiband dipole spacing is substantially 90 mm and the azimuth beamwidth is substantially 45 degrees.

11. The multiband antenna of claim 9, wherein the multiband dipole spacing is substantially 114 mm, and the azimuth beamwidth is substantially 65 degrees.

12. The multiband antenna of claim 8, wherein each of the four dipole arms comprises a gap that is disposed in the central region, wherein the gap substantially occupies a region colinear with the dipole arm.

* * * * *